Patented Apr. 11, 1950

2,504,084

UNITED STATES PATENT OFFICE 2,504,084

HEXACHLOROTHIOLENE

Henry D. Norris, Woodbury, N. J., and John H. McCracken, Corpus Christi, Tex., assignors to Socony-Vacuum Oil Company, Incorporated, a corporation of New York No Drawing. Application May 10, 1947,
Serial No. 747,328

7 Claims. (Cl. 260—329)

In copending application Serial No. 613,202, filed August 28, 1945, now abandoned, of which the present application is a continuation-in-part, there is described a process involving complete chlorination of thiophene. The present invention relates to a new composition produced by complete chlorination of thiophene in the presence of iodine as catalyst and, more particularly, is concerned with a catalytic process for effecting the complete chlorination of thiophene to produce hexachlorothiolene.

Chlorination is a term well known in the art and when applied to hydrocarbons ordinarily connotes the direct substitution of a chlorine atom for a hydrogen atom. The chlorination may be carried to such an extent that all the hydrogen atoms of a hydrocarbon may be replaced by chlorine atoms. This is referred to in the art as complete chlorination. It has been discovered, in accordance with the present invention, that when thiophene is subjected to complete chlorination in the presence of a small amount of iodine, the chlorinated product includes a compound which contains an amount of chlorine in excess of the amount which accounts for the expected and ordinary total chlorination of the thiophene nuclei or the complete replacement of the 4 hydrogen atoms in the thiophene nuclei.

It has been found, as set forth hereinafter, that when thiophene is subjected to complete chlorination in the presence of iodine, hexachlorothiolene is obtained. This new composition of matter is a useful lubricating oil addition agent particularly adapted for use as an additive in extreme pressure lubricants. Moreover, as those skilled in the art will recognize, the new compound of this invention, by reason of the high activity of its chlorine atoms, will serve as a useful chemical intermediate in the synthesis of further new compositions.

Accordingly, it is an object of the present invention to provide a new composition of matter. Another object is to provide hexachlorothiolene. A further impotrant object is to provide a lubricating oil addition agent. A further object is to provide a lubricating oil composition. A more specific object is to afford a process for manufacturing hexachlorothiolene. Other objects and advantages of the present invention will become apparent to those skilled in the art from the following description.

Broadly stated, the present invention provides a new composition of matter, hexachlorothiolene; a new addition agent for lubricating oils; and a method for preparing hexachlorothiolene, which comprises contacting thiophene with chlorine in the presence of an iodine catalyst under conditions for effecting complete chlorination.

Hexachlorothiolene is a colorless substance having a melting point of 40.5–41° C. and a boiling point of 90.5–91.5° C. at a pressure of 2 millimeters of mercury. It is stable up to a temperature of about 225° C., above which the compound tends to decompose into chlorine and various polychlorothiophenes, hexachlorothiolene has a density of 1.753 at 26.5° C. compared to that of water at 4° C. and a refractive index at 20° C. of 1.5878.

The formula of hexachlorothiolene is $C_4SCl_6$. The hexachlorothiolene obtained in accordance with the present invention has the following analysis:

|  | Analysis | Theoretical |
| --- | --- | --- |
|  | Per Cent | Per Cent |
| Chlorine | 72.47 | 72.7 |
| Sulfur | 10.92 | 10.91 |
| Carbon | 16.49 | 16.41 |

In infra-red absorption spectra study of the compound showed that it had lost all characteristics of thiophene and a definite absorption band for an olefinic linkage appeared. Further evidence that the compound of this invention was hexachlorothiolene was shown by reaction of the compound with zinc dust. As is well known to those skilled in the art, dihalogen compounds of the nature —CHCl—CHCl— dehalogenate upon treatment with zinc dust to produce olefins. The compound of this invention, upon treatment with zinc dust, gave a product mixture which analysis showed to contain a small amount of dichlorothiophene, a small amount of trichlorothiophene, and about 80 per cent of 2,3,4,5-tetrachlorothiophene. The predominant reaction accordingly was:

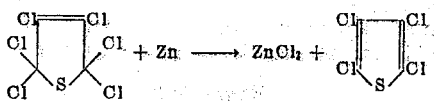

In accordance with the present invention, hexachlorothiolene may be obtained by subjecting thiophene to complete chlorination in the presence of a catalyst of iodine and with or without the use of solvents such as chloroform, carbon tetrachloride, etc.

The chlorination reaction of the present invention will generally be carried out at a temperature varying between about 0° C. and about 120° C., preferably at a temperature between about 40° C. and about 70° C. and a reaction time sufficient to effect a complete chlorination of thiophene. The amount of iodine employed as catalyst will be less than 0.5 mole per mole of thiophene reactant. Generally, minute amounts of iodine will be employed, usually in the range of from about .0005 to about 0.1 mole of iodine per mole of thiophene. The above amounts, while representative of those which will generally be employed in the present process, do not appear to be critical, it being only necessary that the amount of iodine present be less than about 0.5 mole per mole of thiophene. This is illustrated by the data tabulated below:

Table I

| Iodine in grams per Mole of Thiophene | Grams of Hexachlorothiolene per Mole of Thiophene |
| --- | --- |
| 10 | 220 |
| 2.4 | 200 |
| 1.66 | 216 |
| 0.33 | 216 |
| 0.1 | 175 |

The following example will serve to illustrate the process of this invention without limiting the same:

Example 1

Two hundred ten grams of thiophene (2.5 moles) and 10 grams of iodine were placed in a 1-liter flask equipped with a stirrer, a spiral-type condenser, a thermometer, and a chlorine inlet tube. Chlorine was bubbled through the thiophene-iodine mixture at a temperature of about 40° C. at such a rate as to require cooling of the flask to avoid an increase in temperature. After about one hour, the color of the iodine disappeared and the temperature was allowed to rise to 70–75° C. The temperature was maintained at 70–75° C. through cooling for about 4.5 hours. The product was washed with water and subsequently dissolved in benzene. The benzene solution was washed with a 5% aqueous solution of potassium carbonate, given two separate washes with a 5% aqueous solution of sodium thiosulfate, again washed with a 5% solution of potassium carbonate, and finally given two separate washes with water. The washed benzene solution was filtered and then dried over anhydrous sodium sulfate. The dried product was filtered and the solvent was removed on a steam bath. The product thus obtained was distilled under reduced pressure to yield 562 grams of hexachlorothiolene.

As stated hereinbefore, the chlorination reaction may be effected in the presence or absence of a solvent. Chloroform and carbon tetrachloride may be mentioned by way of non-limiting illustrations.

The following example will serve to illustrate the chlorination reaction where a solvent is used:

Example 2

Twenty-five and 2/10 grams of thiophene (0.3 mole), 75 grams of chloroform (solvent), and 3 grams of iodine were placed in a 500-c. c., three-necked flask equipped with a stirrer, a reflux condenser, a thermometer, and a chlorine inlet tube. Chlorine was bubbled into the flask for 50 minutes, at a rate to maintain a temperature of 40° C. At the end of 50 minutes, the temperature increased to 55–60° C. and remained at this level for a period of time of about 3 to 5 hours, at the end of which the temperature decreased, indicating that the reaction had been completed. The product was washed with water and then dissolved in ethyl ether. This solution was given two separate washes with water, two separate washes with a 5% aqueous solution of potassium carbonate, two separate washes with a 5% aqueous solution of sodium thiosulfate, another wash with a 5% aqueous solution of potassium carbonate, and finally another two separate washes with water. The washed ethyl ether solution was dried overnight over anhydrous sodium sulfate. The solvent was removed on a water bath and the product thus obtained was distilled under reduced pressure to yield an impure hexachlorothiolene. This impure product was redistilled to yield pure hexachlorothiolene, B. P. 90.5–91.5° C. at 2 mm., M. P. 40.5–41° C.

The process may be carried out as a batch, continuous or semi-continuous type of operation. For efficient operation, whether the process is carried out on a batch or continuous basis, it is essential that the reactants be intimately contacted with one another in the presence of iodine. This may be achieved in several ways and in apparatus that are well known in the art.

Hexachlorothiolene, when added in minor proportions to lubricating oils, improves their extreme pressure characteristics. The amounts ordinarily added for this purpose will be between about 1 per cent and about 10 per cent by weight and, generally speaking, a sufficient amount will be added to improve the extreme pressure characteristics of a lubricating oil. The beneficial results obtained by adding varying amounts of hexachlorothiolene to gear oils may be shown by standard lubricant tests, such as the Almen load test and the S. A. E. gear oil test. The Almen load test consists of placing a 30-gram sample of the lubricant to be tested in a small metal cup of the Almen test machine. The cup is provided with a ¼″ drill rod shaft rotating in a split bushing at 600 revolutions per minute. Weights are added at ten-second intervals over a period of 5 minutes to a loading lever working to apply pressure on the split bushing. The Almen value is expressed as the number of weights. Each weight weighs 2 pounds and is equivalent to 1000 pounds per square inch pressure. Torque meter readings are valuable as indications of the friction developed in the test. The S. A. E. gear oil test consists of placing a 120-gram sample of the lubricant to be tested in the standard S. A. E. gear test machine and the two steel test rings thereof are then adjusted in place. The shafts rotate the rings at different speeds against each other in the same direction so as to produce a combination of rolling and sliding action while a gradually increasing load is applied. The main shaft rotates at 1000 revolutions per minute. The loading rate is 75 pounds per minute and the test is continued until scoring occurs.

Results of the foregoing tests using a solvent-refined Mid-Continent oil having a Saybolt universal viscosity of 67 seconds at 210° F. with and without a minor proportion of hexachlorothiolene are given below:

Table II

| Amount of Hexachlorothiolene, Per Cent by Weight | S. A. E. Test Lbs. Scale | Almen Load Test | |
|---|---|---|---|
| | | Wts. | Torque |
| None | 20 | 3 | Test specimen seized before test was completed. |
| 3 | 460 | 6 | 17. |
| 5 | over 530 | 16 | 21. |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process for producing hexachlorothiolene which comprises contacting thiophene with chlorine in the presence of a small amount less than 0.5 mole of iodine per mole of thiophene for a sufficient length of time to effect complete chlorination.

2. The process for producing hexachlorothiolene which comprises contacting thiophene with chlorine in the presence of between about .0005 and about 0.1 mole of iodine per mole of thiophene for a sufficient length of time to effect complete chlorination.

3. The process for producing hexachlorothiolene which comprises contacting thiophene with chlorine at a temperature between about 0° C. and about 120° C. in the presence of a small amount less than 0.5 mole of iodine per mole of thiophene for a sufficient length of time to effect complete chlorination.

4. The process for producing hexachlorothiolene which comprises contacting thiophene with chlorine at a temperature between about 40° C. and about 70° C. in the presence of a small amount less than 0.5 mole of iodine per mole of thiophene for a sufficient length of time to effect complete chlorination.

5. The process for producing hexachlorothiolene, which comprises mixing thiophene and a small amount of less than 0.5 mole of iodine per mole of thiophene, bubbling chlorine through the thiophene-iodine mixture at a temperature in the range of 0–120° C. for a sufficient length of time to effect complete chlorination, removing unreacted iodine from the resulting reaction product mixture, neutralizing said product, and distilling the same to separate therefrom hexachlorothiolene.

6. The process for producing hexachlorothiolene, which comprises mixing thiophene and a small amount of less than 0.5 mole of iodine per mole of thiophene, bubbling chlorine through the thiophene-iodine mixture at such a rate that that the temperature is maintained within the range of 40 to 70° C. until complete chlorination is effected, removing unreacted iodine from the resulting reaction product mixture, neutralizing said product and distilling the same to separate therefrom hexachlorothiolene.

7. As a new composition of matter, 2,2,3,4,5,5-hexachloro-3-thiolene.

HENRY D. NORRIS.
JOHN H. McCRACKEN.

REFERENCES CITED

The following references are of record in the file of this patent:

UNITED STATES PATENTS

| Number | Name | Date |
|---|---|---|
| 1,471,150 | Dziewonski | Oct. 16, 1923 |
| 2,208,161 | Prutton | July 16, 1940 |
| 2,410,401 | Coffman | Oct. 29, 1946 |
| 2,411,225 | Patterson | Nov. 19, 1946 |

OTHER REFERENCES

Willgerodt: J. für Praktische Chemie, 33, 150–151 (1886).

Steinkopf: Ann. 532, 280 (1937).

Morton: "The Chemistry of Heterocyclic Compounds," pages 42 and 43, McGraw-Hill, 1946.

Groggins: "Unit Processes in Organic Synthesis," p. 183, McGraw-Hill, 1938.

Gilman: "Organic Chemistry," vol. 1, ed. 2, p. 858, John Wiley, Inc., 1943.

Berichte, 18, 450–1 (1885).

Alles: J. Pharm. and Exp. Ther. 72, 265 (1941).